3,178,425
5:6-DIHYDRO-1:3:4-THIAZENES
Karl Hoffmann, Binningen, and Alfred Hunger, Basel, Switzerland, assignors to Ciba Corporation, a corporation of Delaware
No Drawing. Filed Aug. 11, 1961, Ser. No. 130,759
Claims priority, application Switzerland, Aug. 17, 1960, 9,309/60; June 28, 1961, 7,574/61
10 Claims. (Cl. 260—243)

The present invention relates to 2-tertiary amino-alkylmercapto-5:6-dihydro-1:3:4-thiazines in which the alkyl radical separates the amino from the mercapto group by at least two carbon atoms and of their salts, and a process for preparing same.

In the new compounds the 5:6-dihydro-1:3:4-thiazine radical may contain further C-substituents, but it is preferably unsubstituted. Substituents are, for example, aliphatic radicals, preferably lower alkyl radicals such as methyl, ethyl, n-propyl or isopropyl, n-butyl or isobutyl, or aromatic radicals, preferably phenyl groups which themselves may be substituted by lower alkyl, such as methyl, ethyl or propyl groups, free or etherified hydroxyl or mercapto, for example lower alkoxy such as methoxy, ethoxy, n- or i-propoxy groups or lower alkyl mercapto such as methylmercapto or ethylmercapto groups, alkylenedioxy such as methylenedioxy, esterified hydroxyl for example lower alkanoyloxy such as acetoxy or propionyloxy, lower alkoxycarbonyloxy such as methoxycarbonyloxy, acyl such as acetyl or propionyl, halogen atoms such as fluorine, chlorine, bromine or iodine atoms, halogenoalkyl such as trifluoromethyl, nitro, amino, preferably tertiary amino, for example di-lower alkylamino such as dimethylamino or diethylamino groups.

In the tertiary aminoalkylmercapto radical in the 2-position of the 5:6-dihydro-1:3:4-thiazine the alkylene radical is straight or branched and separates the amino from the mercapto group preferably by 2 to 6 carbon atoms. The alkylene radical is, for example, a 1:2-ethylene, 1:2-, 1:3- or 2:3-propylene, 1:2-, 1:3-, 1:4-, 2:3- or 2:4-butylene, 2:3- or 1:5-pentylene or 1:6-hexylene group.

Suitable substituents of the tertiary amino group are above all lower aliphatic hydrocarbon radicals which may also be interrupted by hetero atoms such as oxygen, nitrogen or sulfur atoms and/or may be substituted by free hydroxyl group. One of these hydrocarbon radicals may also be linked to the alkylene radical separating the amino from the mercapto group and form with the alkylene radical preferably a 5- or 6-membered ring. As lower aliphatic hydrocarbon radicals there may be mentioned above all: lower alkyl, alkenyl, alkylene or alkenylene such as methyl, ethyl, n-propyl or isopropyl groups, straight or branched radicals bound in any desired position, being butyl, pentyl, hexyl or heptyl, allyl or methallyl, butylene-(1:4), pentylene-(1:5), hexylene-(1:5), hexylene-1:6), heptylene-(2:6), heptylene-(1:7), pentene-(2)-ylene-(1:5) or hexene-(3)-ylene-(2:5), unsubstituted or lower alkyl-substituted cycloalkyl or cycloalkenyl, cycloalkyl-lower alkyl or cycloalkenyl-lower alkyl such as cyclopentyl, 2-methylcyclopentyl, cyclohexyl, cycloheptyl, cyclopentenyl, cyclohexenyl, 3-methylcyclohexenyl, cyclopentylmethyl, 2 - (3 - methylcyclopentyl)-ethyl, 2-cyclohexylpropyl, cyclopentenylethyl or cyclohexenylethyl; furthermore aralkyl or aralkenyl, for example phenyl-methyl, -ethyl, or -n-propyl and the aryl radicals may be substituted at the nucleus as specified above for aromatic radicals. Aliphatic hydrocarbons which are interrupted by hetero atoms and are suitable for substituting the amino group are, for example, lower alkoxyalkyl, such as 2-methoxy-ethyl, 2-ethoxy-ethyl, 2-(n- or i-propoxy)-ethyl, 2-butoxy-ethyl or 3-methoxypropyl, also oxa-, aza- or thia-alkylenes or -alkenylene such as 3-aza-, oxa- or thia-pentylene-(1:5), 3-azahexylene-(1:6), 4-azaheptylene-(2:6), 3-methyl-3-aza-pentylene-(1:5) or 3-β-hydroxyethyl-3-azapentylene-(1:5).

A tertiary aminoalkylmercapto radical in which one of the hydrocarbon radicals substituting the amino group is also linked to the alkylene group, is, for example an N - methyl-pyrrolidyl - (2) - methylmercapto, 2 - [N-methyl-piperidyl-(2)]-ethylmercapto or N-methyl-piperidyl-(4)-mercapto.

The tertiary amino group is above all a di-lower alkylamino such as a dimethylamino, diethylamino, methylethylamino or dipropylamino group or an unsubstituted or lower alkylated pyrrolidino, piperidino, morpholino, thiamorpholino, piperazino or 4-(ω-hydroxy-lower-alkyl)-piperazino group.

The new compounds possess valuable pharmacological properties. Above all they are distinguished by their analgesic, antipyretic and antiphlogistic action, so that they can be used as medicaments in human or veterinary medicine. They are also valuable intermediates for the manufacture of medicaments.

Of special value are compounds of the formula (I) 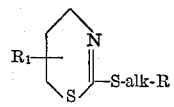

and their salts, in which $R_1$ represents a hydrogen atom or lower alkyl group such as methyl, ethyl, n-propyl or iso-propyl; "alk" represents a straight or branched alkylene radical which contains 2 to 6 carbon atoms and which separates R from the mercapto group by at least 2 carbon atoms, and R represents an amino group which is disubstituted by a lower alkyl group such as methyl, ethyl, propyl or butyl or by a lower alkylene group, wherein the lower alkylene radical may be interrupted by oxygen, sulfur or nitrogen atoms, for example butylene-(1:4), pentylene-(1:5), hexylene-(1:6), or 3-oxa-, thia- or azapentylene-(1:5), -hexylene-(1:5), -hexylene-(1:6) or 3-methyl-3-azapentylene-(1:5) or 4-methyl-4-azaheptylene-(2:6).

In this group of compounds those of the formula (II) 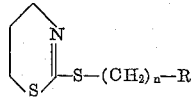

and their salts deserve special mention; in this formula $n=2$, 3 or 4 and R represents a dialkylamino group containing 2 to 8 carbon atoms, or an unsubstituted pyrrolidino, piperidino, morpholino or piperazino group or one of these groups substituted by an alkyl group containing 1 to 4 carbon atoms; above all 2-(β-diethylaminoethylmercapto)-5:6-dihydro-1:3:4-thiazine and 2-(β-morpholino - ethylmercapto)-5:6-dihydro-1:3:4-thiazine and their salts.

The new compounds are obtained by condensing a 2-X-5:6-dihydro-1:3:4-thiazine with a compound of the formula Y-alk-R, in which one of the radicals X and Y stands for chlorine or bromine and the other for a mercapto group; "alk" represents an alkylene radical and R a tertiary amino group or chlorine and exchanging in resulting compounds in which R represents chlorine, the chlorine atom for the tertiary amino group.

Of the two substituents X and Y preferably one, especially X, represents a free mercapto group and the other a chlorine or bromine atom. If R is chlorine, then Y stands advantageously for bromine, so that a 2-(Cl-alk)-5:6-dihydro-1:3:4-thiazine results in the first step. In case X stands for bromine or especially for chlorine, the mercapto compound HS-alk-R advantageously is in the form of its sodium salt and R preferably stands for a tertiary amino group.

The condensation of the halogen compound with the mercapto compound is advantageously carried out in the presence of a condensing agent such as an alkali metal or alkaline earth metal, for example, lithium, sodium, potassium or calcium, or an amide, hydride, hydrocarbon compound, alcoholate, oxide, hydroxide or carbonate thereof, for example sodamide, sodium hydride, butyl lithium, phenyl potassium or lithium, potassium tertiary butylate, potassium tertiary amylate, sodium ethylate, calcium oxide, sodium hydroxide or potassium hydroxide or sodium carbonate or bicarbonate or potassium carbonate or bicarbonate or aluminum alkylates such as aluminum tertiary butylate, aluminum-hydrocarbon compounds such as aluminum triisopropyl or aqueous ammonia or strong organic bases such as pyridine or trimethylamine, and advantageously in the presence of a diluent or solvent such as water or organic solvents, for example alkanols such as methanol, ethanol, n-propanol, isopropanol or tertiary butanol, ethers such as diethyl ether, dioxane or tetrahydrofuran, ketones such as acetone, formamides such as dimethylformamide, hydrocarbons such as benzene, toluene or petroleum ether or mixtures thereof. The reaction is preferably performed at room temperature or, if necessary, at a lower or higher temperature, under atmospheric or superatmospheric pressure, or in the presence of an inert gas, for example nitrogen.

The chlorine atom in the 2-(Cl-alkyl-mercapto)-5:6-dihydro-1:3:4-thiazines is exchanged for the tertiary amino group in the usual manner for example by treatment of the compound with a secondary amine e.g. at room temperature or an elevated temperature, in the presence or absence of diluents or solvents, under atmospheric or superatmospheric pressure, or in the presence of an inert gas.

The starting materials are known or can be made by known methods or methods described in the examples. If desired, they may also be used in the form of their salts.

Depending on the reaction conditions and starting materials used the new compounds are obtained in the free form or in the form of their salts. From the salts the free bases can be prepared in known manner. By reacting the latter with acids, basic, neutral, acid or mixed salts can be prepared. Such acid addition salts are preferably made with the use of therapeutically valuable acids, for example inorganic acids such as hydrochloric, hydrobromic, perchloric, nitric, thiocyanic acid, sulfuric or phosphoric acids or organic acids such as formic, acetic, propionic, glycollic, lactic, pyruvic, oxalic, malonic, succinic, maleic, fumaric, malic, tartaric, citric, ascorbic, hydroxymaleic, dihydroxymaleic, benzoic, phenylacetic, 4-aminobenzoic, 4-hydroxybenzoic, anthranilic, cinnamic, mandelic, salicylic, 4-aminosalicylic, 2-phenoxybenzoic, 2-acetoxybenzoic, methanesulfonic, ethanesulfonic, hydroxyethanesulfonic, benzenesulfonic, para-toluenesulfonic, naphthalenesulfonic or sulfanilic acid, or methionine, tryptophan, lysine or arginine. The resulting products may be mono-salts or poly-salts, hemi-, mono-, sesqui- or poly-hydrates.

The new compounds are intended for use as medicaments in the form of pharmaceutical preparations containing said compounds in conjunction with pharmaceutical organic or inorganic, solid or liquid excipients suitable for local, enteral for example oral, or parenteral administration. Suitable excipients are substances that do not react with the new compounds such, for example, as water, gelatine, lactose, starch, magnesium stearate, talc, vegetable oils, benzyl alcohols, gums, polyalkylene glycols, white petroleum jelly, cholesterol or other known medicinal excipients. The pharmaceutical preparations may be, for example, tablets, dragees or capsules, or in liquid form solutions, suspensions or emulsions. They may be sterilized and/or may contain assistants such as preserving, stabilizing, wetting or emulsifying agents, salts for regulating the osmotic pressure, or buffers. They contain the active principle advantageously in an amount of 30–95%. They may also contain further therapeutically valuable substances. The new compounds may also be used in veterinary medicine.

The following examples illustrate the invention.

Example 1

A suspension of 10.6 grams of 2-mercapto-5:6-dihydro-1:3:4-thiazine in 110 cc. of water is treated with 23 grams of β-chlorethyl-dimethylamine hydrochloride; in the course of one hour at 25° C. 32 cc. of 10 N-sodium hydroxide solution are stirred in dropwise and the mixture is stirred for another 16 hours at 25° C., then extracted with chloroform, and the chloroform extract is washed with water, dried over magnesium sulfate and evaporated. The remaining 2-(β - dimethylamino-ethylmercapto)-5:6-dihydro-1:3:4-thiazine of the formula

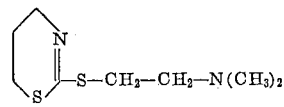

is distilled in a Claisen flask at 117–119° C. under 0.2 mm. Hg. The hydrochloride is prepared by dissolving the product in ethanol and adding the calculated amount of ethanolic hydrochloric acid; it melts at 160–161° C.

Example 2

A suspension of 10.6 grams of 2-mercapto-5:6-dihydro-1:3:4-thiazine in 80 cc. of water is treated at 25° C. with stirring within one hour dropwise simultaneously with 16 cc. of 10 N-sodium hydroxide solution and 16.8 grams of β-chlorethyl-diethylamine and the mixture is stirred for another 16 hours at 25° C., and then extracted with chloroform. The chloroform extract is washed with water, dried over magnesium sulfate and evaporated in vacuo. The crude 2-(β - diethylamino-ethylmercapto)-5:6-dihydro-1:3:4-thiazine of the formula

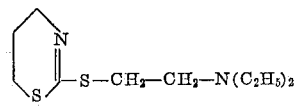

is distilled in a bulb tube at 110° C. under 0.1 mm. Hg. The hydrochloride is prepared by dissolving the product in ethanol and adding the calculated amount of ethanolic hydrochloric acid; it melts at 142–143° C.

Example 3

A suspension of 21.3 grams of 2-mercapto-5:6-dihydro-1:3:4-thiazine in 150 cc. of water is treated with 55 grams of β-chlorethyl-morpholine hydrochloride; in the course of one hour at 25° C. 64 cc. of 10 N-sodium hydroxide solution are stirred in dropwise and the mixture is stirred for 16 hours at 25° C. The reaction mixture is extracted with chloroform and the extract is washed with aqueous sodium carbonate solution, dried over magnesium sulfate and evaporated. The remaining 2-(β-morpholinoethylmercapto)-5:6-dihydro-1:3:4-thiazine of the formula

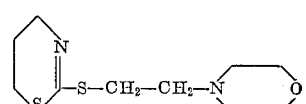

is then distilled and passes over at 170–178° C. under 0.2 mm. Hg. When the product is dissolved in ethanol and treated with the calculated amount of ethanolic hydrochloric acid, it yields its hydrochloride melting at 187–188° C.

Example 4

A suspension of 8.0 grams of 2-mercapto-5:6-dihydro-1:3:4-thiazine in 50 cc. of water is treated with 20.2 grams of 1-(β-chlorethyl)-4-methylpiperazine; within one hour at 25° C. 26 cc. of 10 N-sodium hydroxide solution are added dropwise and the mixture is stirred for 16 hours at 25° C. and then extracted with chloroform. The extract is washed with aqueous sodium carbonate solution, dried over magnesium sulfate and evaporated, to yield 2-[β-(4 - methylpiperazino) - ethylmercapto]-5:6-dihydro-1:3:4-thiazine of the formula

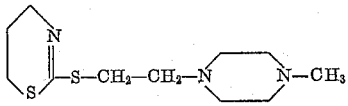

which is distilled in a bulb tube at 130–140° C. under 0.05 mm. Hg. When this prodct is dissolved in ethanol and treated with the calculated amount of ethanolic hydrochloric acid, it yields its mono-hydrochloride melting at 154–155° C.

*Example 5*

30 grams of 2-pyrrolidino-ethyl chloride hydrochloride are added to 10.6 grams of 2-mercapto-5:6-dihydro-1:3:4-thiazine suspended in 100 cc. of water, 32 cc. of 10 N-sodium hydroxide solution are added dropwise at 25° C. and the mixture stirred for 16 hours at 25° C. The reaction mixture is then extracted with chloroform, the extract washed with aqueous sodium carbonate solution, dried over magnesium sulfate and evaporated. The remaining 2-(β-pyrrolidinoethylmercapto) - 5:6 - dihydro-1:3:4-thiazine of the formula

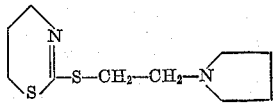

is then distilled in a bulb tube at 160° C. under 0.2 mm. pressure of mercury. The monohydrochloride prepared from the above product by dissolving the latter in ethanol and adding the calculated quantity of ethanolic hydrochloric acid melts at 158–159° C.

*Example 6*

30 grams of 2-piperidino-ethyl chloride hydrochloride are added to a suspension of 10.6 grams of 2-mercapto-5:6-dihydro-1:3:4-thiazine in 100 cc. of water, 32 cc. of 10 N-sodium hydroxide solution are added dropwise at 25° C. and the reaction mixture stirred for 16 hours at 25° C. The reaction mixture is extracted with chloroform, the extract washed with aqueous sodium carbonate solution, dried over magnesium sulfate and evaporated to yield 2-(β-piperidinoethylmercapto) - 5:6 - dihydro-1:3:4-thiazine of the formula

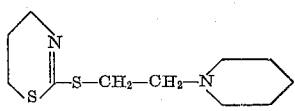

which is distilled in a bulb tube at 130–140° C. under 0.1 mm. pressure of mercury. The monohydrochloride prepared from the above product by dissolving the latter in ethanol and adding the calculated quantity of ethanolic hydrochloric acid melts at 186–187° C.

*Example 7*

31 grams of γ-dimethylaminopropyl chloride hydrochloride are added to 10.6 grams of 2-mercapto-5:6-dihydro-1:3:4-thiazine suspended in 100 cc. of water, 32 cc. of 10 N-sodium hydroxide solution are added dropwise at 25° C. and the reaction mixture stirred for 16 hours at 25° C. The reaction mixture is extracted with chloroform, the extract washed with aqueous sodium carbonate solution, dried over magnesium sulfate and evaporated. The remaining 2-(γ-dimethylaminopropylmercapto)-5:6-dihydro-1:3:4-thiazine of the formula

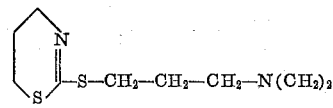

passes over in a bulb tube at 150–160° C. under 0.2 mm. pressure of mercury. The product is dissolved in ethanol and the calculated quantity of ethanolic hydrochloric acid is added to yield the monohydrochloride melting at 144–145° C.

*Example 8*

25 grams of 1-dimethylaminopropyl-(2)-chloride hydrochloride are added to a suspension of 10.6 grams of 2-mercapto-5:6-dihydro-1:3:4-thiazine in 100 cc. of water, 32 cc. of 10 N-sodium hydroxide solution are added dropwise at 25° C. and the whole stirred for 16 hours at that temperature. The reaction mixture is then extracted with chloroform, the extract washed with aqueous sodium carbonate solution, dried over magnesium sulfate and evaporated to yield 2-(β-dimethylaminopropylmercapto)-5:6-dihydro-1:3:4-thiazine of the formula

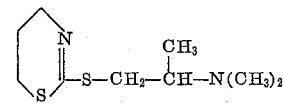

which is distilled in a bulb tube at 140–150° C. under 0.2 mm. pressure of mercury. The monohydrochloride prepared from the above product by dissolving the latter in ethanol and adding the calculated quantity of ethanolic hydrochloric acid melts at 138–139° C.

*Example 9*

10.6 grams of 2-mercapto-5:6-dihydro-1:3:4-thiazine are suspended in 100 cc. of water, 45 grams of γ-diethylaminopropylchloride hydrochloride are added, 48 cc. of 10 N-sodium hydroxide solution are added dropwise at 25° C. and the whole stirred for 16 hours at 25° C. The reaction mixture is extracted with chloroform, the extract washed with aqueous sodium carbonate solution, dried over magnesium sulfate and evaporated to yield 2-(γ - diethylaminopropylmercapto) - 5:6-dihydro-1:3:4-thiazine of the formula

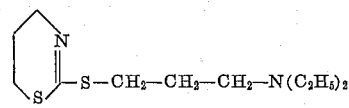

which passes over in a bulb tube at 140–150° C. under 0.1 mm. pressure of mercury. The product is dissolved in ethanol, and the calculated quantity of ethanolic hydrochloric acid added to obtain the hydrochloride melting at 166–167° C.

*Example 10*

6.7 grams of β-morpholinoethylchloride hydrochloride are added to 6.3 grams of 2-mercapto-6-phenyl-5:6-dihydro-1:3:4-thiazine suspended in 100 cc. of water and 100 cc. of dioxane, 7.2 cc. of 10 N-sodium hydroxide solution are added dropwise at 25° C. and the reaction mixture stirred for 16 hours at 25° C. The mixture is extracted with chloroform, the extract washed with aqueous sodium carbonate solution, dried over magnesium sulfate and evaporated to yield 2-(β-morpholinoethylmercapto)-6 - phenyl - 5:6-dihydro-1:3:4-thiazine of the formula

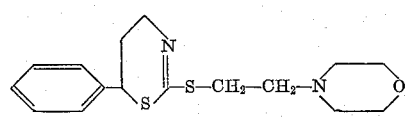

which is distilled in a bulb tube at 180–200° C. under 0.05 mm. pressure of mercury. When the above compound is dissolved in ethanol and the calculated quantity of ethanolic hydrochloric acid added, the monohydrochloride melting at 168–169° C. is obtained.

The 2-mercapto-6-phenyl-5:6-dihydro-1:3:4-thiazine used as starting material may be prepared as follows:

72.5 grams of benzoylacetonitrile in 200 cc. of tetrahydrofuran are added dropwise to 40 grams of lithium aluminum hydride in 1 liter of absolute tetrahydrofuran and the reaction mixture stirred for 16 hours at 20 to 25° C. 40 cc. of water, 40 cc. of sodium hydroxide solution of 15% strength and 120 cc. of water are then added dropwise to the reaction mixture under nitrogen at a maximum temperature of 25° C., the precipitate filtered off, distilled, evaporated and the resulting γ-phenyl-γ-hydroxy-propylamine crystallized from pentane; melting point 56 to 57° C.

Hydrogen chloride is introduced into a solution of 38 grams of γ-phenyl-γ-hydroxy-propylamine in 375 cc. of toluene until saturation is achieved, 90 grams of thionyl chloride are then added dropwise at 25° C., the reaction mixture stirred for 2 hours at 50° C. and the precipitated γ-phenyl-γ-chloropropylamine hydrochloride melting at 113–115° C. filtered with suction.

60 cc. of carbon disulfide are added to 46 grams of γ-phenyl-γ-chloropropylamine hydrochloride in 575 cc. of water, 493 cc. of 1 N-sodium hydroxide solution are added dropwise at 10 to 20° C. and the reaction mixture stirred for 14 hours at 20 to 25° C. The reaction mixture is exhaustively extracted with chloroform and the extracts washed with sodium bicarbonate, dried over magnesium sulfate and evaporated. The 2-mercapto-6-phenyl-5:6-dihydro-1:3:4-thiazine obtained is crystallized from acetone; melting point 173–174° C.

Example 11

11.2 grams of β-morpholino-ethylchloride hydrochloride are added to 8.75 grams of a suspension of 2-mercapto-4:4:6-trimethyl-5:6-dihydro-1:3:4-thiazine in 100 cc. of water, 12 cc. of 10 N-sodium hydroxide solution are added dropwise at 25° C. and the reaction mixture stirred for 16 hours at 20 to 25° C. The reaction mixture is extracted with chloroform, the extract washed with aqueous sodium carbonate solution, dried over magnesium sulfate and evaporated to yield 2 - (β - morpholinoethylmercapto)-4:4:6-trimethyl-5:6-dihydro-1:3:4-thiazine of the formula

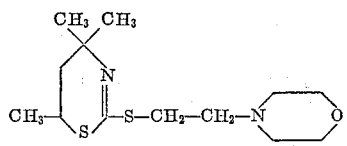

which passes over in a bulb tube at 130° C. under 0.05 mm. pressure of mercury. When the product is dissolved in alcohol and an equivalent quantity of ethanolic hydrochloric acid is added, its hydrochloride is obtained melting at 183–184° C.

Example 12

23.5 grams of 1-chloro-3-bromo-propane are added to 13.3 grams of 2-mercapto-5:6-dihydro-1:3:4-thiazine suspended in 100 cc. of water, and 15 cc. of 10 N-sodium hydroxide solution are added dropwise in the course of 30 minutes. The reaction mixture is then stirred for 16 hours at 25° C. and for 4 hours at 40° C., the precipitated crude 2 - (γ-chloropropyl-mercapto)-5:6-dihydro-1:3:4-thiazine taken up in ether, washed with water, the ether extract dried over magnesium sulfate and evaporated. The resulting crude 2 - (γ-chloropropylmercapto)-5:6-dihydro-1:3:4-thiazine is dissolved in 200 cc. of chloroform, 40 cc. of diethylamine are added, and the reaction mixture allowed to stand for 3 days at 25° C. The chloroform solution is shaken with sodium carbonate solution, dried over magnesium sulfate, evaporated and the crude 2-(γ-diethylamino-propylmercapto)-5:6-dihydro - 1:3 - thiazine distilled at 130 to 140° C. under 0.1 mm. pressure of mercury.

Example 13

Under nitrogen, 30 grams of β-mercapto-ethylmorpholine in 200 cc. of dioxane are added to 2.5 grams of shiny sodium. The reaction mixture is stirred until all of the sodium has reacted. 13.5 grams of 2-chloro-5:6-dihydro-1:3:4-thiazine are then added and the whole boiled for 16 hours while stirring. The reaction mass is filtered with suction, the solid constitutents washed with dioxane, the filtrate evaporated, and the residue taken up in ether. The ethereal solution is washed with sodium carbonate solution and water, dried over magnesium sulfate, and evaporated. The residual 2-(β-morpholinoethylmercapto)-5:6-dihydro-1:3:4-thiazine boils at 170–180° C. under a pressure of 0.2 mm. of Hg and is identical with the product of Example 3. It can be converted into the hydrochloride melting at 187–188° C. in a manner analogous to that described in Example 3.

The 2-chloro-5:6-dihydro-1:3:4-thiazine used as starting material can be prepared as follows:

266 grams of 2-mercapto-5:6-dihydro-1:3:4-thiazine are suspended in 2 liters of chloroform, and the suspension stirred while a solution of 260 grams of phosgene in 1.6 liters of toluene is added dropwise, after which the reaction mixture is stirred on for 16 hours at 25° C. The excess of phosgene is then expelled with nitrogen, the precipitated 2 - chloro-5:6-dihydro-1:3:4-thiazine-hydrochloride filtered off with suction, washed with toluene, and dried. The resulting salt is taken up in water, the solution alkalinized at 0° C. with sodium carbonate, extracted with ether, the ethereal solution dried over magnesium sulfate, and evaporated. The 1-chloro-5:6-dihydro-1:3:4-thiazine which remains behind boils at 103° C. under a pressure of 12 mm. of Hg.

Example 14

The products of the process of the present invention may be used in the form of pharmaceutical preparations. Capsules containing 200 mg. of 2-(β-morpholinoethylmercapto)-5:6-dihydro-1:3:4-thiazine hydrochloride may be obtained, for example as follows.

Ingredients for 1000 capsules:

|  | Grams |
|---|---|
| 2 - (β-morpholinoethylmercapto)-5:6-dihydro-1:3:4-thiazine hydrochloride | 200.00 |
| Talc | 20.00 |
| Magnesium stearate | 5.00 |

The triturated and sieved ingredients are mixed thoroughly and the mixture filled into gelatine capsules in portions of 225 mg.

What is claimed is:

1. A member selected from the group consisting of a compound of the formula

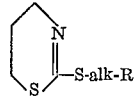

in which alk stands for lower alkylene separating the nitrogen atoms from the mercapto group by at least two carbon atoms and R stands for a member selected from the group consisting of pyrrolidino, piperidino, morpholino, thiamorpholino, piperazino, lower alkyl-pyrrolidino, lower alkyl-piperidino, lower alkyl-morpholino, lower alkyl-thiamorpholino and lower alkyl-piperazino, and the therapeutically useful acid addition salts thereof.

2. A member selected from the group consisting of a compound of the formula

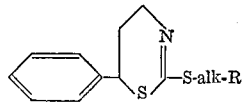

in which alk stands for lower alkylene separating the nitrogen atom from the mercapto group by at least two carbon atoms and R stands for a member selected from the group consisting of di-lower alkyl-amino, pyrrolidino, piperidino, morpholino, thiamorpholino, piperazino, lower alkyl-pyrrolidino, lower alkyl-piperidino, lower alkyl-morpholino, lower alkyl-thiamorpholino and lower alkyl-piperazino, and the therapeutically useful acid addition salts thereof.

3. 2 - ($\beta$ - morpholinoethylmercapto) - 5:6 - dihydro-1:3:4-thiazine.

4. 2 - [$\beta$ - (4 - methyl-piperazino)-ethylmercapto]-5:6-dihydro-1:3:4-thiazine.

5. 2 - ($\beta$-pyrrolidinoethylmercapto)-5:6-dihydro-1:3:4-thiazine.

6. 2 - ($\beta$ - piperidinoethylmercapto) - 5:6 - dihydro-1:3:4-thiazine.

7. 2 - ($\beta$ - morpholinoethylmercapto)-6-phenyl-5:6-dihydro-thiazine.

8. 2 - ($\beta$ - morpholinoethylmercapto)-4:4:6-trimethyl-5:6-dihydro-1:3:4-thiazine.

9. 2-chloro-5:6-dihydro-1:3:4-thiazine.

10. 2 - ($\gamma$ - chloropropylmercapto)-5:6-dihydro-1:3:4-thiazine.

References Cited by the Examiner
UNITED STATES PATENTS

| | | | |
|---|---|---|---|
| 2,323,923 | 7/43 | Mathes | 260—788 |
| 2,356,163 | 8/44 | Jones et al. | 260—788 |
| 2,424,175 | 7/47 | Jones et al. | 260—788 |
| 2,547,682 | 4/51 | Baumgartner | 260—243 |
| 2,604,462 | 7/52 | Mathes | 260—788 |

IRVING MARCUS, *Primary Examiner.*

NICHOLAS S. RIZZO, *Examiner.*